United States Patent
Auckenthaler

(10) Patent No.: US 9,267,452 B2
(45) Date of Patent: Feb. 23, 2016

(54) METHOD AND APPARATUS FOR MEASURING AND CONTROLLING THE EGR RATE IN A COMBUSTION ENGINE

(75) Inventor: Theophil Auckenthaler, St. Gallen (CH)

(73) Assignee: FPT MOTORENFORSCHUNG AG, Arbon (CH)

( * ) Notice: Subject to any disclaimer, the term of this patent is extended or adjusted under 35 U.S.C. 154(b) by 479 days.

(21) Appl. No.: 13/261,333

(22) PCT Filed: Dec. 22, 2010

(86) PCT No.: PCT/EP2010/070470
§ 371 (c)(1),
(2), (4) Date: Jun. 22, 2012

(87) PCT Pub. No.: WO2011/076837
PCT Pub. Date: Jun. 30, 2011

(65) Prior Publication Data
US 2012/0325188 A1  Dec. 27, 2012

(30) Foreign Application Priority Data
Dec. 23, 2009 (EP) .................................... 09180649

(51) Int. Cl.
*F02M 25/07* (2006.01)
*F02D 41/00* (2006.01)
*F02D 41/14* (2006.01)
*F02D 41/24* (2006.01)

(52) U.S. Cl.
CPC ........ *F02D 41/0072* (2013.01); *F02D 41/0007* (2013.01); *F02D 41/1445* (2013.01); *F02D 41/2438* (2013.01); *F02D 41/2451* (2013.01); *Y02T 10/144* (2013.01); *Y02T 10/47* (2013.01)

(58) Field of Classification Search
CPC ......... F02B 47/08; F02M 25/07; F02D 41/00; F02D 21/08
USPC ............................ 123/568.21, 406.48, 568.11
See application file for complete search history.

(56) References Cited

U.S. PATENT DOCUMENTS 5,753,805 A * 5/1998 Maloney ..................... 73/114.32
6,422,219 B1 * 7/2002 Savonen et al. .......... 123/568.12
(Continued)

FOREIGN PATENT DOCUMENTS

CN  1269868  10/2000
DE  4214648  11/1993
(Continued)

OTHER PUBLICATIONS

Machine Translation of WO 2005111401 A1.*

*Primary Examiner* — Stephen K Cronin
*Assistant Examiner* — Xiao Mo
(74) *Attorney, Agent, or Firm* — Stetina Brunda Garred & Brucker

(57) ABSTRACT

The present invention provides for a method and apparatus for measuring and controlling the EGR rate in a combustion engine system, comprising an EGR cooler, an EGR valve and a turbine, and determining the EGR mass flow ($dm_{EGR}$) from the difference between the total exhaust gas mass flow ($dm_{Tot}$) across the engine cylinders, and the turbine mass flow ($dm_{Turb}$) across the turbine.

16 Claims, 2 Drawing Sheets

(56) References Cited

U.S. PATENT DOCUMENTS

| | | |
|---|---|---|
| 6,715,287 B1 | 4/2004 | Engel et al. |
| 7,512,479 B1 * | 3/2009 | Wang .................... 701/103 |
| 2003/0216856 A1 * | 11/2003 | Jacobson ............... 701/114 |
| 2006/0116472 A1 | 6/2006 | Staratschek et al. |
| 2006/0271271 A1 * | 11/2006 | Chauvin et al. ......... 701/109 |
| 2007/0039320 A1 * | 2/2007 | Gu et al. ................ 60/599 |
| 2009/0090106 A1 * | 4/2009 | Muller ................... 60/602 |
| 2009/0249786 A1 * | 10/2009 | Garrett et al. ........... 60/612 |
| 2009/0283077 A1 * | 11/2009 | Murata et al. ........ 123/568.16 |

FOREIGN PATENT DOCUMENTS

| | | |
|---|---|---|
| JP | 2003359716 | 10/2003 |
| JP | 2006200377 | 8/2006 |
| JP | 2006249954 | 9/2006 |
| JP | 2006316709 | 11/2006 |
| JP | 2009150267 | 7/2009 |
| WO | WO0148363 | 7/2001 |
| WO | WO2005111401 | 11/2005 |
| WO | WO 2005111401 A1 * | 11/2005 |

* cited by examiner

METHOD AND APPARATUS FOR MEASURING AND CONTROLLING THE EGR RATE IN A COMBUSTION ENGINE

FIELD OF THE INVENTION

The present invention relates to a method and apparatus for measuring and controlling the EGR rate in a combustion engine.

DESCRIPTION OF THE PRIOR ART

The NOx emissions of a combustion engine can be significantly reduced using exhaust gas recirculation (EGR). Exhaust gas is recirculated in order to reduce the oxygen content of the combustion gas. This leads to a reduced flame temperature, which in turn results in lower NOx emissions of the engine.

Thereby, the NOx emissions react very sensitively to variations of the EGR rate.

The EGR rate is given by the mass ratio between the recirculated exhaust gas and the total gas in the cylinder. Dependent on the emission target, EGR rates between 20% and 60% are aimed at, which leads to an NOx reduction factor of about 3 to 10 times.

Since increasing EGR rates involve higher soot emissions, often higher fuel consumption and generally increased wear of the engine, this technique should only be applied where necessary.

Therefore, an accurate sensing and control concept of the EGR rate is crucial and necessary, for a precise and reproducible control of the NOx emissions.

Several EGR mass flow or EGR rate measurement methods are known.

The first most common measurement method is the measurement of the fresh air mass flow at the inlet of the engine. This mass flow is subtracted from the total cylinder mass flow, which can be obtained from the boost air pressure p2, the boost air temperature T2, the engine speed, and also other quantities, as depicted in FIG. 1, for example from sensors of crank speed Crs and cam speed Cas. The resulting mass flow is the EGR mass flow.

The first major problem of this concept is the accuracy. The measurement error of the air mass flow is amplified by the ratio between the air mass flow and the EGR mass flow. If e.g. an air mass flow of 80 kg/h with 10% error (i.e. 8 kg/h), and a total gas mass flow of 100 kg/h is measured, an EGR mass flow of 20 kg/h with an error of 8 kg/h is obtained, which corresponds to a relative error of 40%. The second major problem is the time delay, which occurs from the distance between the air measurement device and the cylinder. In order to obtain an accurate EGR rate also under transient conditions, the time delay must be accounted for, which is a difficult task.

A second possibility is the use of a direct EGR mass flow measurement device. Various measurement principles can be applied, such as hot film measurement, or pressure difference over a Pitot tube or a Venturi device.

From a point of view of accuracy, this approach is the most robust one. However, most available sensors exhibit significant problems with deterioration caused by the aggressive environment with high loads of soot. Soot deposits can even lead to a blocking of the sensing elements. Another problem is the high level of pulsations in the EGR line. These pulsations may lead to significant measurement errors.

A third possibility is the measurement of the oxygen concentration ($O_2$ or air/fuel ratio Lambda) at engine inlet or outlet. From this oxygen content, the EGR rate can be calculated directly, if the amount of injected fuel and the total gas mass flow are known. The latter is obtained from p2, T2, the engine speed, and also other quantities, as in the first method (FIG. 1).

In order to achieve a sufficient accuracy of the EGR rate, the oxygen sensors have to be very accurate, especially, if low EGR rates are applied, which is common in heavy-duty applications. Currently, no sensors are available on the market, which meet the accuracy requirements.

A fourth possibility is the measurement of carbon dioxide ($CO_2$) upstream or downstream of the cylinders, which is widely applied in engine test benches. The calculation of the EGR rate is done in a similar way as when an oxygen sensor is used.

Though ideal from an accuracy point of view, no sensors are currently available for mobile applications.

A fifth possibility is the measurement of the pressure drop over the EGR line and turbine upstream temperature T3. Taking into account the EGR valve position, the EGR mass flow can be obtained using a throttle equation.

The flow resistance characteristic of the EGR line may significantly change over the lifetime because of soot deposits, EGR cooler fouling, etc. Additionally, EGR valve characteristics may significantly vary because of production scatter. Therefore, it is very difficult to ensure a stable EGR rate over the engine lifetime with this measurement principle.

SUMMARY OF THE INVENTION

Therefore it is the main object of the present invention to provide a method and apparatus for measuring and controlling the EGR rate in a combustion engine which overcomes the above problems and drawbacks.

The basic idea of the invention is the determination of the EGR rate using pressure and temperature sensors. Instead of calculating the EGR rate directly from the pressure drop over the EGR line, the EGR mass flow [$dm_{EGR}$] is obtained from the difference between the total exhaust gas mass flow [$dm_{Tot}$] across the cylinders and the turbine mass flow [$dm_{Turb}$] across the turbine.

These and further objects are achieved by means of a method and apparatus for measuring and controlling the EGR rate in a combustion engine as described in the attached claims, which form an integral part of the present description.

BRIEF DESCRIPTION OF THE DRAWINGS

The invention will become fully clear from the following detailed description, given by way of a mere exemplifying and non limiting example, to be read with reference to the attached drawing figures, wherein.

The same reference numerals and letters in the figures designate the same or functionally equivalent parts.

DETAILED DESCRIPTION OF THE PREFERRED EMBODIMENTS

The EGR rate, or EGR mass flow, is determined from the difference between the total gas mass flow and the fuel mass flow in the cylinders and the gas mass flow through the turbine.

Both the total gas mass flow and the turbine mass flow are obtained from models, which make use of the pressure sensors p2 (boost air pressure), p3 (turbine inlet pressure), temperature sensor T2 (boost air temperature), and, if available, p4 (turbine outlet pressure), and T3 (turbine inlet temperature).

Figure 1:
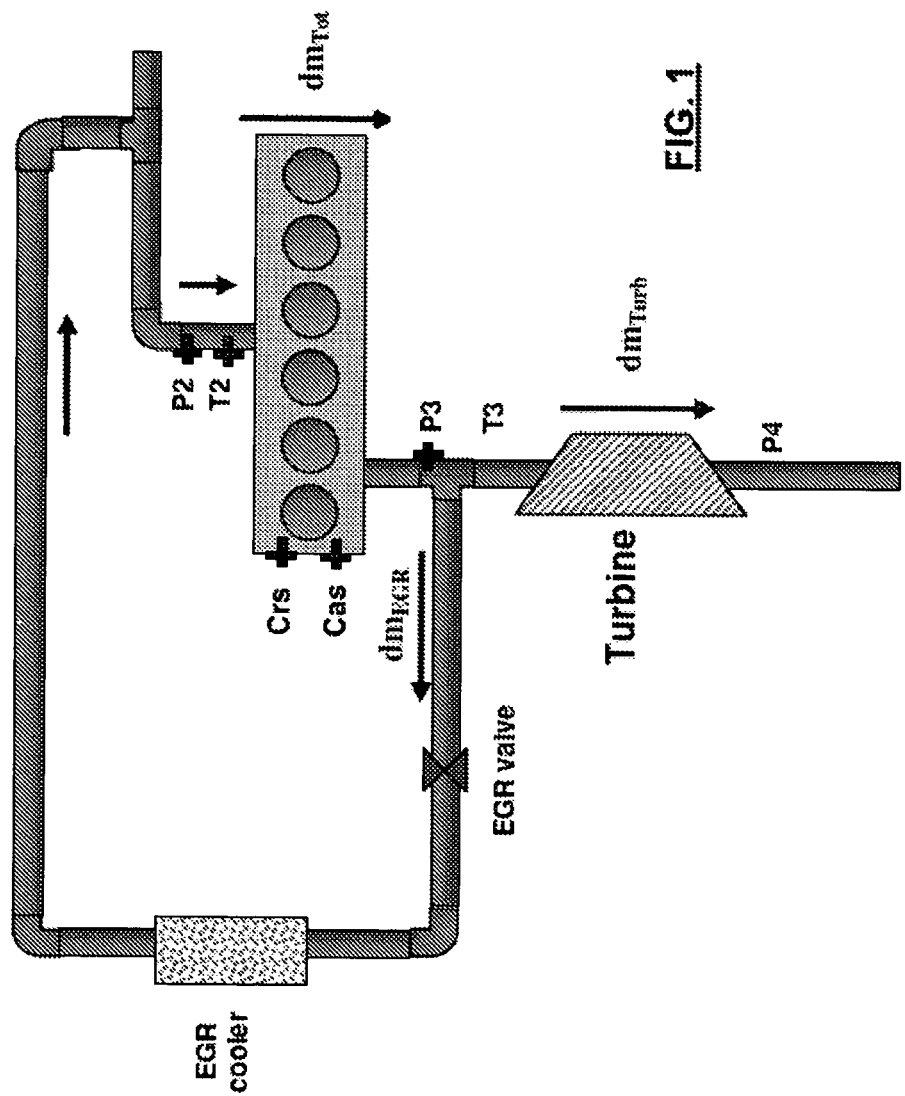
FIG. 1 shows a schematic of a part of an engine circuit including sensors for the implementation of the method of the invention.

FIG. 1 shows the sensors in a known schematic of a part of an engine circuit, including the engine, an EGR cooler, a turbine, where the outlet of the EGR cooler is brought to the inlet of the cylinders, and the outlet of the cylinders is brought to the turbine and to the inlet of the EGR cooler through an EGR valve.

Optionally, in order to increase the accuracy of this measurement concept, the turbine mass flow is adapted such that it matches the total gas mass flow, when the EGR valve is closed and thus the EGR mass flow is zero.

The basic idea of the invention is the determination of the EGR rate using pressure and temperature sensors. Instead of calculating the EGR rate directly from the pressure drop over the EGR line, the EGR mass flow $dm_{EGR}$ is obtained indirectly from the difference between the total exhaust gas mass flow $dm_{Tot}$ across the cylinders and the turbine mass flow $dm_{Turb}$ across the turbine.

The total exhaust gas mass flow $dm_{Tot}$ is obtained from a model, where the total gas charge in a cylinder per stroke is calculated using p2, T2, and possibly also p3 and T3. Such models, which are often referred to as "speed-density models" are widely used and known.

Together with the engine speed, the actual gas mass flow can be calculated from the gas charge. The total exhaust gas mass flow $dm_{Tot}$ is then obtained as the sum of the total gas mass flow and the fuel mass flow.

The calculation of the total gas mass flow $dm_{Tot}$ can be made applying well known expressions.

The turbine mass flow $dm_{Turb}$ is calculated using a model.

If a fix geometry turbine is used, the turbine mass flow $dm_{Turb}$ can be obtained from the upstream and the downstream pressures p3 and p4 of the turbine, respectively, and from the upstream temperature T3 of the turbine. The pressure p3 is obtained from a sensor, the pressure p4 from a model or from a sensor. T3 is usually obtained from a model.

If a variable geometry turbine (VGT) is used, the VGT position has also to be taken into account for the determination of the turbine mass flow $dm_{Turb}$.

In case of a waste gate turbine, the opening of the waste gate has also to be taken into account for the determination of the turbine mass flow $dm_{Turb}$.

The calculation of the turbine mass flow $dm_{Turb}$ can be made applying well known expressions, for example derived from a turbine model determined by using a known expression similar to a throttle equation, as described for example in: Guzzella, Onder: "Introduction to Modeling and Control of Internal Combustion Engine Systems", ISBN3-540-22274-x, Springer-Verlag, Berlin, 2004.

The EGR mass flow $dm_{EGR}$ can now be obtained as the difference between the total exhaust gas mass flow $dm_{Tot}$ and the turbine mass flow $dm_{Turb}$.

$$dm_{EGR}=dm_{Tot}-dm_{Turb}$$

There are several advantages by applying the method of the invention as compared with other methods:
- The turbine hardly changes its flow resistance characteristic over the lifetime, at least much less than the EGR line.
- The distance between the cylinder and the turbine is very small as compared to the one between the engine inlet and the cylinder. Therefore, no significant transport delays are to be expected, as for example in an air mass flow measurement concept.
- A p3 sensor is potentially cheaper than mass flow measurement devices.

Optionally, the accuracy of the EGR mass flow $dm_{EGR}$ determination is improved using an adaptation algorithm. When the EGR valve is closed, the EGR mass flow is approximately zero. Approximately zero means that there is always an irrelevant small value, because the valve never entirely closes.

Hence, the turbine mass flow $dm_{Turb}$ equals the total mass flow $dm_{Tot}$. Either the EGR valve is closed deliberately in order to allow an adaptation procedure, or conditions are utilised, where the valve is closed anyway, for example during acceleration. Since the turbine and the cylinder outlet are very close, the adaptation algorithm can even be applied during transient operation.

Figure 2:
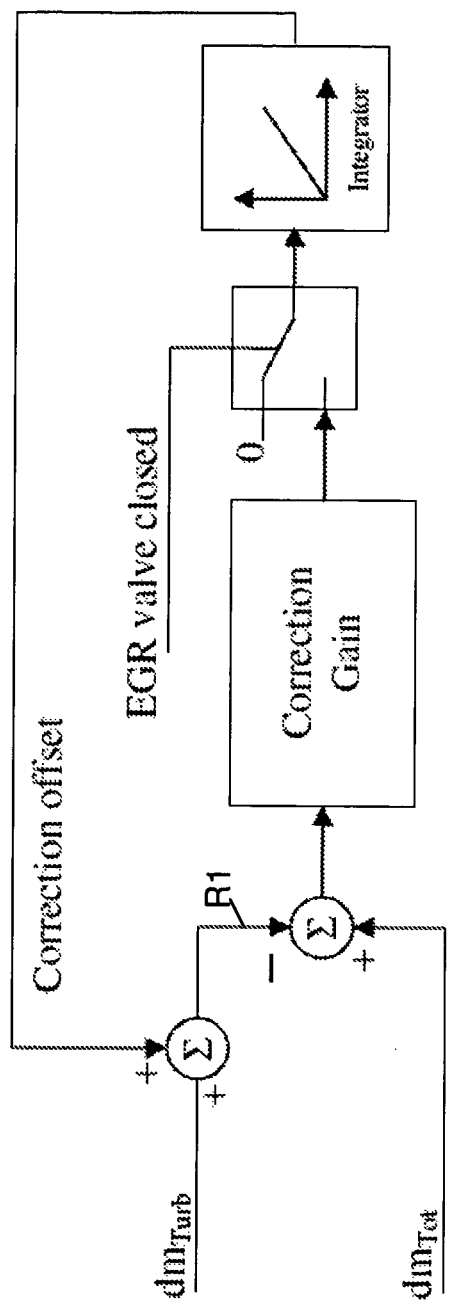
FIG. 2 shows a block diagram of a control circuit for implementation of a variant of the method.

FIG. 2 shows a block diagram of a non limiting example of the adaptation algorithm. It should be any adaptation algorithm, where the turbine mass flow $dm_{Turb}$ or total exhaust gas mass flow $dm_{Tot}$ are adjusted such that they are equal when the EGR valve is closed.

The value of $dm_{Turb}$ is added with a feedback correction offset value coming from an integrator. The result R1 is subtracted from the value of $dm_{Tot}$ and is fed to the input of a block of gain correction, which can be a factor, which is multiplied with the difference between the total mass flow and the corrected turbine mass flow R1.

The output of the gain correction is fed to the integrator only if the EGR valve is closed. If the EGR valve is not closed, the input of the integrator is zero.

In possible variants of the adaptation algorithm, instead of a correction offset, which is added to the turbine mass flow $dm_{Turb}$, also any other correction mechanism can be applied.

A correction factor can be multiplied with the turbine mass flow $dm_{Turb}$ or any other mathematical/algebraic calculation can be used such as correction curves or correction maps.

Instead of the turbine mass flow $dm_{Turb}$, the total mass flow $dm_{Tot}$ can be corrected in the same manner.

Instead of an integrator, also a correction curve or map can be used to calculate the correction offset, factor, or function.

The main principle, however, remains, where any correction is applied such that the integrator or similar mechanism eventually forces the turbine and the total exhaust gas mass flow to be equal, when the EGR valve is closed.

More generally, in case of presence of more than one turbine in the engine system, or with more complicated engine structures, the general principle of the method remains the same.

For example, with more complicated structures including at least two turbines, it is important that the turbine mass flow $dm_{Turb}$ of a turbine downstream of the EGR connection is determined.

For high pressure EGR, the turbine mass flow $dm_{Turb}$ of the first or second turbine has to be determined, for mid pressure EGR, the turbine mass flow $dm_{Turb}$ of the second turbine.

The method of the present invention can be advantageously implemented through a program for computer comprising program coding means for the implementation of one or more steps of the method, when this program is running on a computer. Therefore, it is understood that the scope of protection is extended to such a program for computer and in addition to a computer readable means having a recorded message therein, said computer readable means comprising program coding means for the implementation of one or more steps of the method, when this program is run on a computer.

Many changes, modifications, variations and other uses and applications of the subject invention will become apparent to those skilled in the art after considering the specification and the accompanying drawings which disclose preferred embodiments thereof. All such changes, modifications, variations and other uses and applications which do not depart from the spirit and scope of the invention are deemed to be covered by this invention.

Further implementation details will not be described, as the man skilled in the art is able to carry out the invention starting from the teaching of the above description.

The invention claimed is:

1. A method for measuring and controlling an EGR rate in a combustion engine system, the system comprising engine cylinders, at least an EGR cooler, an EGR valve and a turbine, the method comprising:
   determining an EGR mass flow ($dm_{EGR}$) indirectly from the difference between a total exhaust gas mass flow ($dm_{Tot}$) across the engine cylinders calculated through an cylinder model, and a turbine mass flow ($dm_{Turb}$) across the turbine calculated through a turbine model;
   wherein the cylinder model calculates the total exhaust gas mass flow as the sum of an actual gas mass flow and a fuel mass flow, the actual gas mass flow being calculated from an engine speed and a total gas charge in a cylinder per stroke, the total gas charge in a cylinder per stroke being calculated using a boost air pressure and a boost air temperature at the engine inlet;
   wherein the turbine model calculates the turbine mass flow across the turbine from an upstream pressure, a downstream pressure, and an upstream temperature; and
   adjusting the EGR valve based on the determined EGR mass flow ($dm_{EGR}$).

2. The method according to claim 1, wherein, in a further step of adaptation, the turbine mass flow ($dm_{Turb}$) or total exhaust gas mass flow ($dm_{Tot}$) are adjusted such that they are equal when the EGR valve is closed.

3. The method according to claim 2, further comprising the following steps:
   adding or multiplying a feedback correction value or a feedback correction factor with the turbine mass flow ($dm_{Turb}$), with the feedback correction value or with a feedback correction factor coming from an integrator;
   adding the result of the previous step to the value of the exhaust gas mass flow ($dm_{Tot}$);
   applying a gain correction to the result of the previous step;
   feeding the integrator with the result of the previous step, only if the EGR valve is closed; if the EGR valve is not closed, the input of the integrator is zero.

4. The method according to claim 3, wherein said turbine mass flow ($dm_{Turb}$) and said exhaust gas mass flow ($dm_{Tot}$) are reciprocally exchanged.

5. The method according to claim 1, wherein, in case of a variable geometry turbine (VGT), the turbine model calculates the turbine mass flow additionally from a VGT position.

6. The method according to claim 1, wherein, in case of a waste gate turbine, the turbine model calculates the turbine mass flow additionally from an opening of a waste gate.

7. The method according to claim 1, wherein, in case of more than one turbine, the turbine model additionally calculates the turbine mass flow ($dm_{Turb}$) of a turbine downstream of an EGR connection.

8. The method according to claim 7, wherein, for high pressure EGR, the turbine mass flow ($dm_{Turb}$) of any turbine has to be determined, for mid pressure EGR, the turbine mass flow ($dm_{Turb}$) of a more downstream turbine has to be determined.

9. An apparatus for measuring and controlling an EGR rate in a combustion engine system having at least an EGR cooler, an EGR valve and a turbine, the apparatus comprising:
   a boost air pressure sensor for determining a boost air pressure;
   a boost air temperature sensor for determining a boost air temperature;
   a turbine inlet pressure sensor for determining a turbine inlet pressure;
   a turbine upstream pressure sensor for determining a turbine upstream pressure;
   a turbine downstream pressure sensor for determining a turbine downstream pressure; and
   a turbine upstream temperature sensor for determining a turbine upstream temperature;
   wherein the apparatus indirectly determines an EGR mass flow from the difference between a total exhaust gas mass flow across engine cylinders calculated through a cylinder model having as inputs at least the boost air pressure and the boost air temperature, and a turbine mass flow across the turbine calculated through a turbine model having as inputs at least the turbine upstream pressure, the turbine downstream pressure, and the turbine upstream temperature.

10. The apparatus of claim 9, wherein the apparatus is configured to measure and control the EGR rate in a combustion engine system of a motor vehicle.

11. An article of manufacture comprising a non-transitory computer readable medium, the computer readable medium tangibly embodying one or more programs of instructions executable to perform the method of:
   determining an EGR mass flow ($dm_{EGR}$) indirectly from the difference between a total exhaust as mass flow ($dm_{Tot}$) across the engine cylinders calculated through an cylinder model and a turbine mass flow ($dm_{Turb}$) across the turbine calculated through a turbine model;
   wherein the cylinder model calculates the total exhaust gas mass flow as the sum of an actual gas mass flow and a fuel mass flow, the actual gas mass flow being calculated from an engine speed and a total gas charge in a cylinder per stroke, the total gas charge in a cylinder per stroke being calculated using a boost air pressure, and a boost air temperature at the engine inlet;
   wherein the turbine model calculates the turbine mass flow across the turbine from an upstream pressure, a downstream pressure, and an upstream temperature; and
   adjusting the EGR valve based on the determined EGR mass flow ($dm_{EGR}$).

12. The apparatus according to claim 9, wherein the cylinder model calculates total exhaust gas mass flow as the sum of an actual gas mass flow and a fuel mass flow, wherein the actual gas mass is calculated from an engine speed and a total gas charge in a cylinder per stroke, and wherein the total gas charge in a cylinder per stroke is calculated using the boost air pressure and the boost air temperature.

13. An apparatus according to claim 9, wherein the turbine has a fixed geometry.

14. An apparatus according to claim 9, wherein the turbine has a variable geometry, and wherein the turbine model calculates the turbine mass flow additionally from a turbine variable geometry position.

15. The method according to claim 1, wherein the total gas charge in a cylinder per stroke is additionally calculated using turbine inlet pressure and turbine inlet temperature.

16. The apparatus according to claim 9, wherein the total gas charge in a cylinder per stroke is additionally calculated using turbine inlet pressure and turbine inlet temperature.

* * * * *